(12) United States Patent
Holdampf (10) Patent No.: US 8,066,325 B2
(45) Date of Patent: Nov. 29, 2011

(54) DEPLOYABLE BOLSTER FOR A VEHICLE SEAT

(75) Inventor: Carl J. Holdampf, Farmington Hills, MI (US)

(73) Assignee: Intier Automotive Inc., Newmarket (CA)

( * ) Notice: Subject to any disclaimer, the term of this patent is extended or adjusted under 35 U.S.C. 154(b) by 213 days.

(21) Appl. No.: 12/440,537

(22) PCT Filed: Sep. 12, 2007

(86) PCT No.: PCT/CA2007/001622
§ 371 (c)(1),
(2), (4) Date: Mar. 9, 2009

(87) PCT Pub. No.: WO2008/031218
PCT Pub. Date: Mar. 20, 2008

(65) Prior Publication Data
US 2010/0052388 A1    Mar. 4, 2010

(51) Int. Cl.
*A47C 3/00* (2006.01)
(52) U.S. Cl. ............... 297/284.4; 297/294.9; 297/15
(58) Field of Classification Search ............. 297/15, 297/284.4, 378.12, 284.9
See application file for complete search history.

(56) References Cited

U.S. PATENT DOCUMENTS

| | | | |
|---|---|---|---|
| 2,822,034 A * | 2/1958 | Dixon | 297/230.13 |
| 4,522,445 A | 6/1985 | Goldner et al. | |
| 5,423,593 A * | 6/1995 | Nagashima | 297/284.4 |
| 5,603,550 A * | 2/1997 | Holdampf et al. | 297/238 |
| 5,662,377 A * | 9/1997 | Holdampf et al. | 297/238 |
| 5,681,084 A * | 10/1997 | Yoneda | 297/284.9 |
| 6,056,360 A * | 5/2000 | Schneider | 297/284.4 |
| 6,883,867 B2 * | 4/2005 | Klingler | 297/284.4 |
| 7,086,700 B2 | 8/2006 | Habedank | |
| 7,108,323 B2 | 9/2006 | Welch et al. | |
| 7,131,698 B2 * | 11/2006 | Dowty et al. | 297/408 |
| 7,380,885 B2 * | 6/2008 | Fischer et al. | 297/378.12 |
| 7,448,685 B2 * | 11/2008 | Wilkinson et al. | 297/378.12 |
| 7,461,895 B2 * | 12/2008 | Holdampf et al. | 297/284.9 |
| 2004/0070247 A1 * | 4/2004 | Rhein | 297/284.9 |
| 2004/0140705 A1 | 7/2004 | McMillen et al. | |
| 2006/0061183 A1 * | 3/2006 | White et al. | 297/378.12 |
| 2006/0214487 A1 | 9/2006 | Holdampf et al. | |
| 2006/0273644 A1 | 12/2006 | Sturt et al. | |
| 2007/0132296 A1 * | 6/2007 | Sturt et al. | 297/378.12 |
| 2009/0322133 A1 * | 12/2009 | Yamada et al. | 297/284.9 |
| 2010/0045087 A1 * | 2/2010 | Pyun et al. | 297/284.9 |

FOREIGN PATENT DOCUMENTS
CA    2573203 A1    2/2006
* cited by examiner

*Primary Examiner* — Peter Brown
*Assistant Examiner* — David E Allred
(74) *Attorney, Agent, or Firm* — Miller Canfield (57) ABSTRACT

A seat assembly includes a seat back frame pivotally coupled to a seat cushion for movement between a plurality of reclined seating positions and a fold flat position. A linkage includes first and second links having proximal ends pivotally coupled by a link pin. The first link includes a distal end pivotally coupled to the seat back frame. A control link is coupled at a first end to the link pin and at a second end to the seat cushion. A side bolster is pivotally coupled at an upper end to the seat back frame and at a lower end to a distal end of the second link. Pivoting of the seat back frame between the seating and fold flat positions urges the side bolster between a deployed position extending away from the seat back frame and a retracted position adjacent the seat back frame.

14 Claims, 6 Drawing Sheets

DEPLOYABLE BOLSTER FOR A VEHICLE SEAT

FIELD OF THE INVENTION

The invention relates to a seat assembly for an automotive vehicle. More particularly, the invention relates to a seat back having retractable side bolsters that allow for compact folding of a seat assembly.

DESCRIPTION OF RELATED ART

Automotive vehicles include one or more seat assemblies for supporting occupants within a passenger compartment. The seat assemblies typically include a seat cushion and a seat back pivotally coupled to the seat cushion. The seat back is generally movable between a plurality of upright seating positions and a fold flat position, in which the seat back is folded forwardly against the seat cushion. When the seat back is in the fold flat position, additional storage space is created within the passenger compartment above the folded seat back. In some instances the entire seat assembly may then be moved to a stowed position by pivoting the seat assembly into a recess formed in a floor of the vehicle.

Typically, the seat back includes side bolsters or side support structures for laterally supporting a seat occupant. Such side bolsters are particularly useful in supporting the seat occupant during lateral accelerations of the vehicle. The side bolsters present, however, a problem during folding of the seat back into the fold flat position. Specifically, the side bolsters prevent the seat back from folding completely flat against the seat cushion. As a result, an amount of space within the passenger compartment that would ideally be used for storage is instead occupied by the seat assembly. Additionally, if the seat assembly is stowable in the floor, any space between the seat back and seat cushion requires a deeper recess in the floor, which may create interference issues with undercarriage components of the vehicle.

Consequently, it would be desirable to provide retractable side bolsters that allow a seat back to fold completely flat against a seat cushion in order to maximize storage space within a passenger compartment of an automotive vehicle.

SUMMARY OF THE INVENTION

According to one aspect of the invention, a seat assembly is provided for supporting an occupant in an automotive vehicle. The seat assembly includes a seat back pivotally coupled to a seat cushion for movement between a generally upright seating position, a plurality of reclined seating positions, and a fold flat position overlying the seat cushion. The seat back includes a frame having a pair of side frame members defining a vertical plane. The seat back frame includes a linkage having a first link and a second link pivotally coupled to one another by a link pin. The first link extends between a distal end pivotally coupled to one of the side frame members and a proximal end pivotally coupled by the link pin to a proximal end of the second link. The second link extends between the proximal end and a distal end. A control link extends between a first end pivotally and rotatably coupled to the link pin and a second end pivotally and rotatably coupled to the seat cushion. The seat back frame also includes a side bolster extending between an upper end pivotally coupled to one of the side frame members and a lower end pivotally coupled to the distal end of the second link. Pivoting of the seat back between the upright seating position and the fold flat position urges the side bolster between a deployed position extending away from the vertical plane and a retracted position co-planar with the vertical plane. The side bolster remains in the deployed position as the seat back pivots between the upright seating position and the plurality of reclined seating positions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
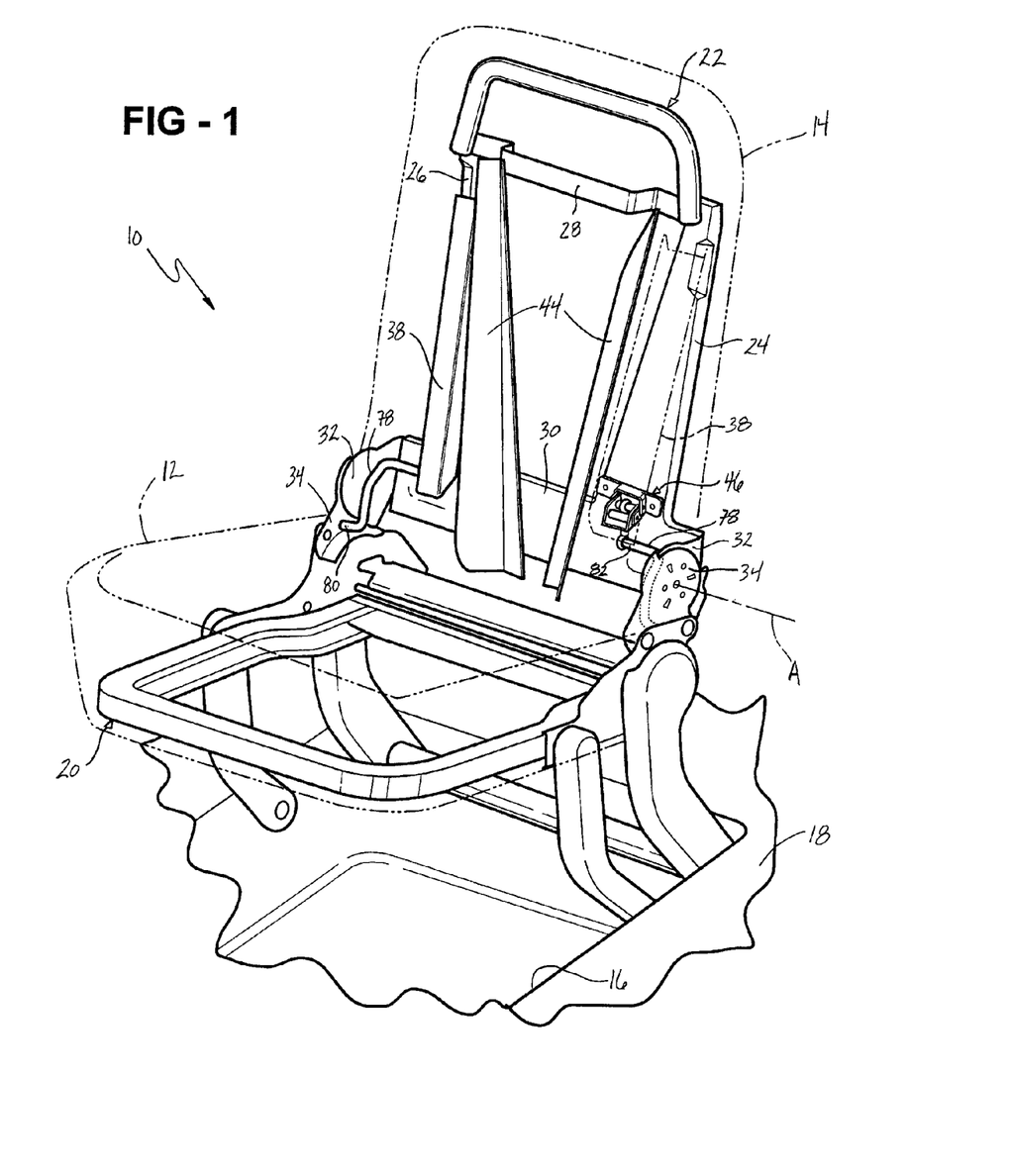
FIG. 1 is a perspective view of a seat assembly in a seating position with side bolsters in a deployed position according to the invention.
Figure 2:
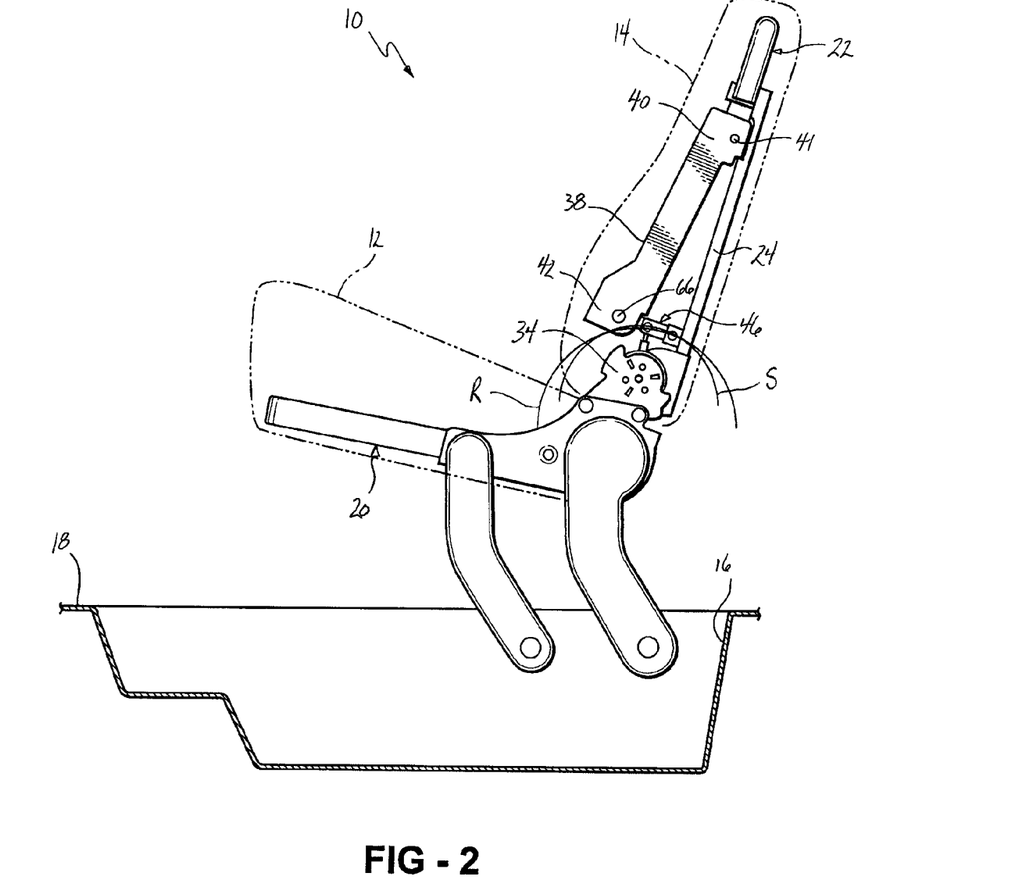
FIG. 2 is a side view of the seat assembly in the seating position with the side bolsters in the deployed position.
Figure 3:
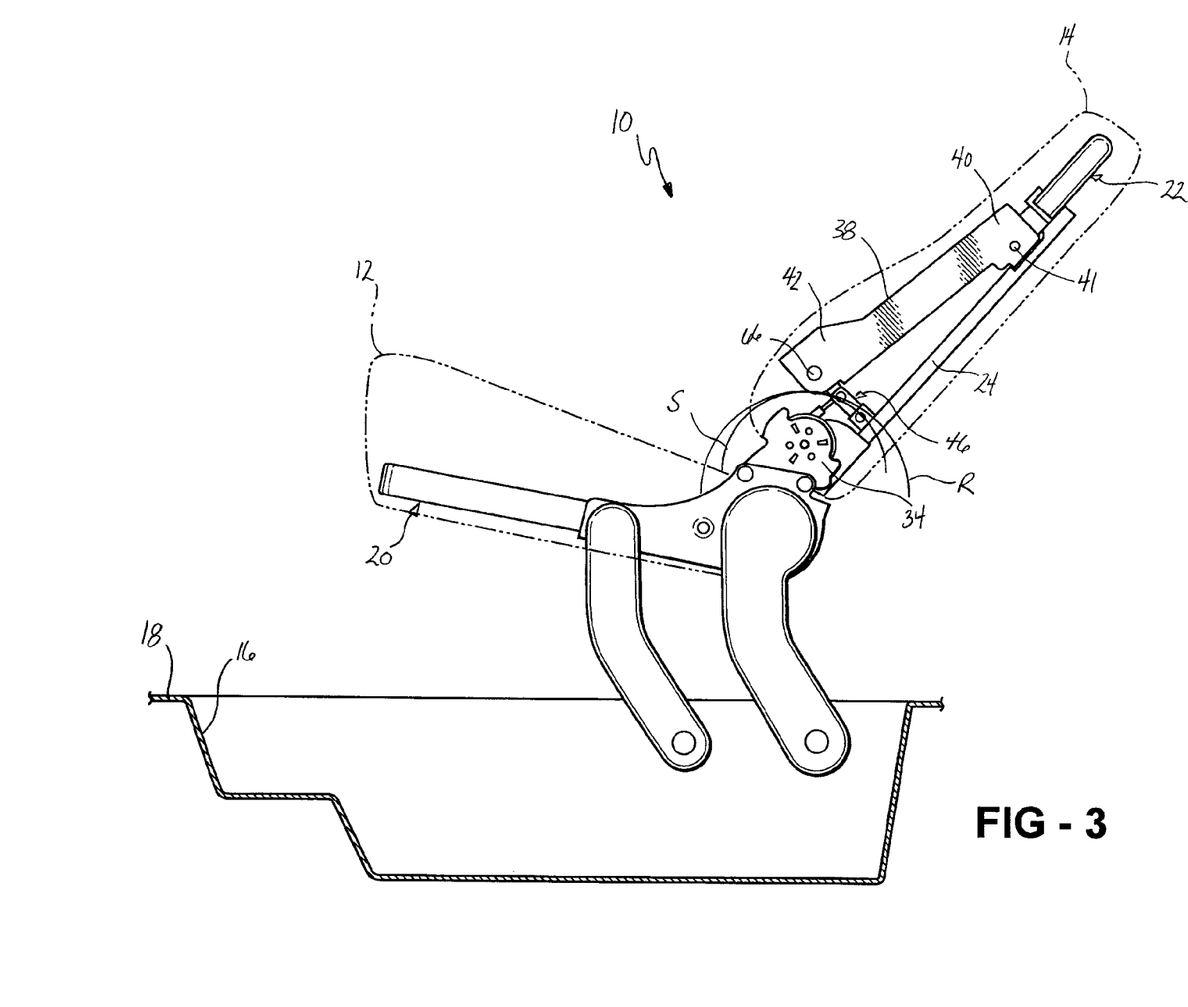
FIG. 3 is a side view of the seat assembly in a reclined seating position with the side bolsters in the deployed position.
Figure 4:
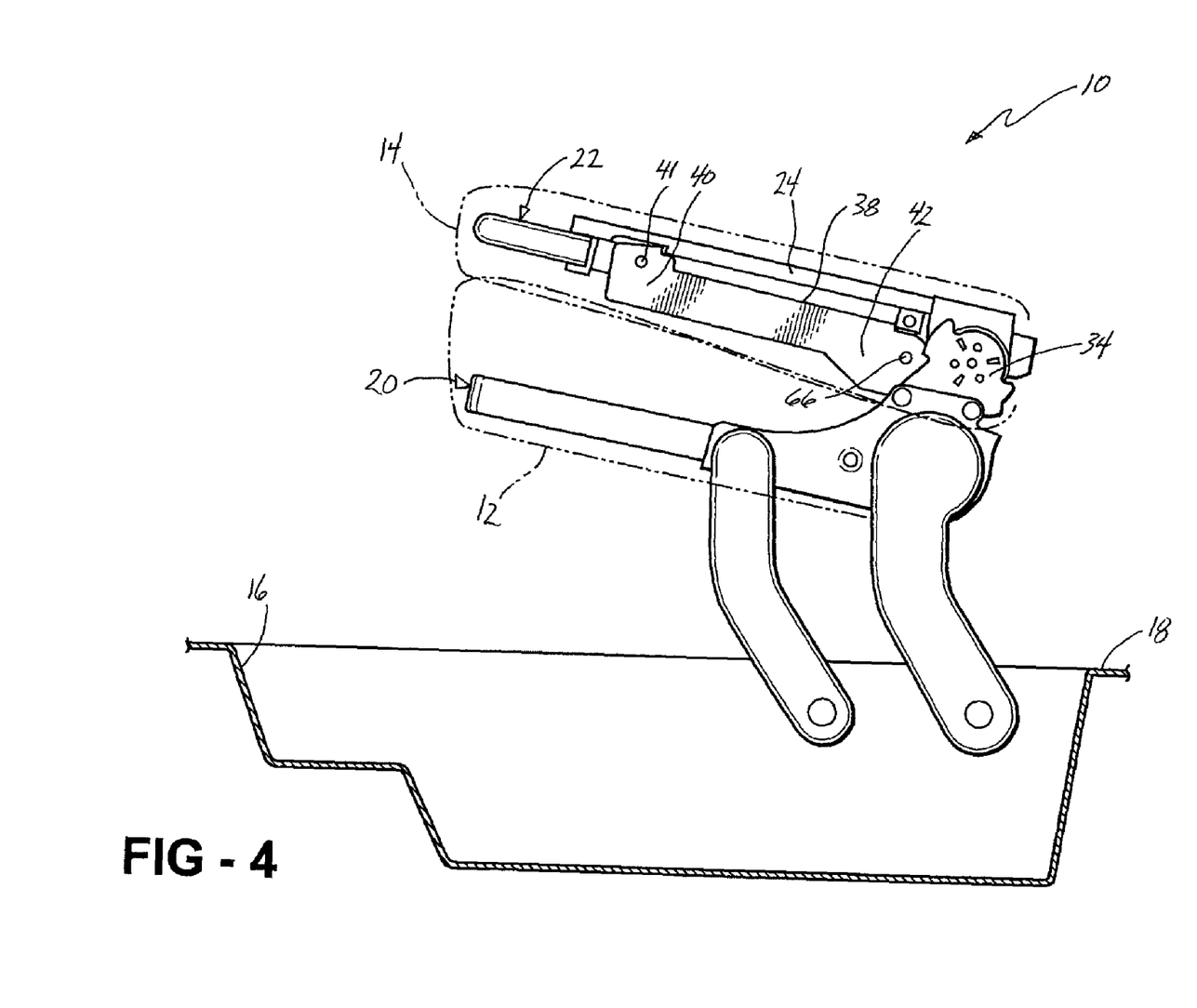
FIG. 4 is a side view of the seat assembly in a forwardly folded flat position with the side bolsters in a retracted position.

Referring to FIG. 1, a seat assembly, generally shown at 10, includes a generally horizontal seat cushion 12 and a seat back 14 for providing support to a seat occupant in an automotive vehicle. The seat back 14 is pivotally coupled to the seat cushion 12 for providing selective adjustment of the seat back 14 between a generally upright seating position, shown in FIGS. 1 and 2, and a plurality or range of reclined seating positions, one of which is shown in FIG. 3. The plurality or range of reclined seating positions is understood to be reclined rearwardly of the generally upright seating position. In addition, the seat back 14 is moveable to a forwardly folded flat position, overlying the seat cushion 12, shown in FIG. 4, for increasing the cargo carrying capacity of the vehicle or when stowing the seat assembly 10 in a recess 16 formed in a floor 18 of the vehicle.

Each of the seat cushion 12 and seat back 14 include a frame assembly, generally indicated at 20 and 22 respectfully, for supporting a contoured foam pad (not shown) encased by a trim cover (not shown), as is well known to one skilled in the art. The seat back frame assembly 22 includes a pair of spaced apart side frame members 24, 26 and an upper cross member 28 extending between the side frame members 24, 26. The side frame members 24, 26 are generally parallel and define a vertical plane therebetween. The seat back frame 22 also includes a lower cross member 30 extending between the side frame members 24, 26. The lower cross member 30 is spaced apart from and parallel to the upper cross member 28.

Figure 5:
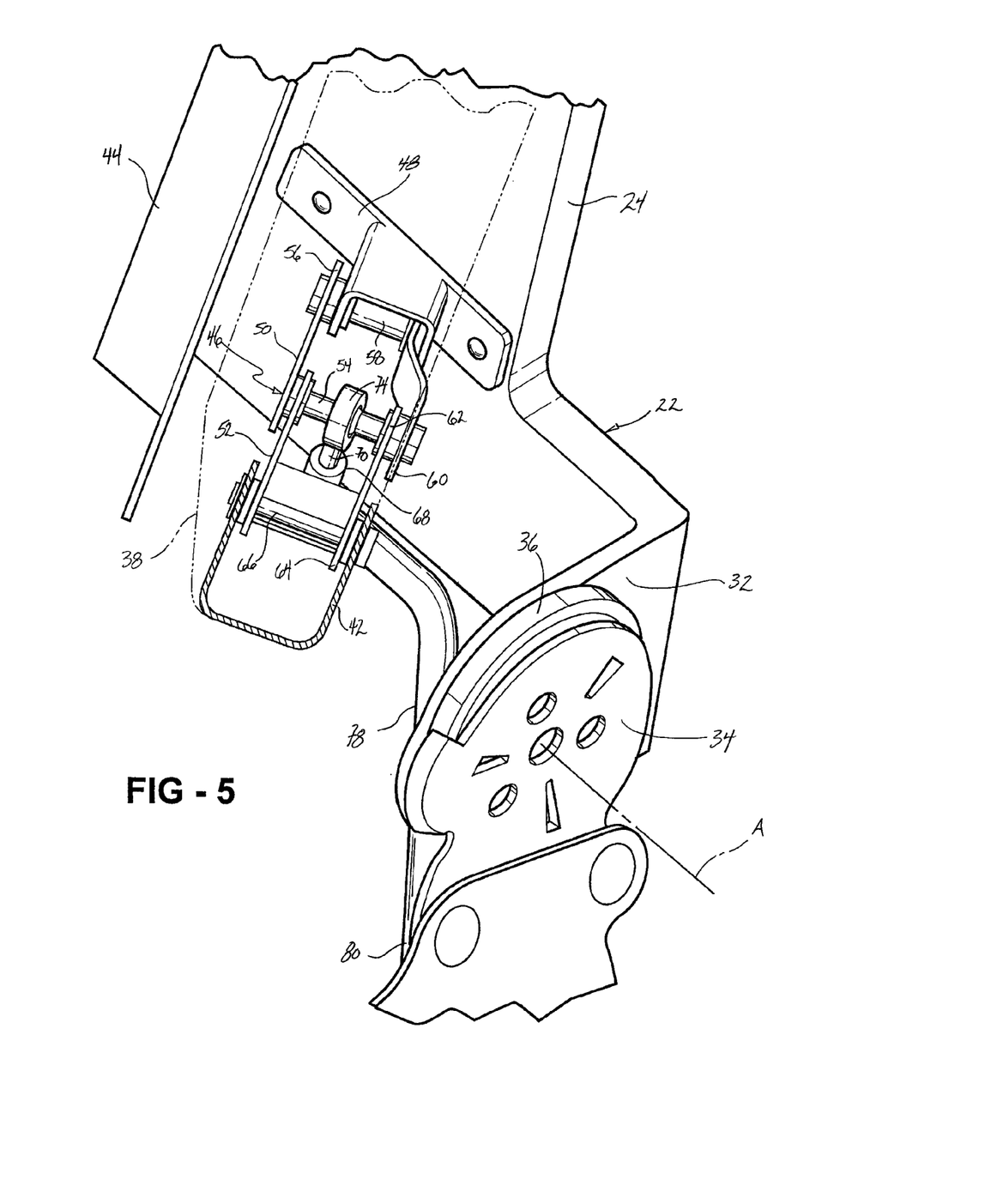
FIG. 5 is an enlarged, side perspective view of a linkage extending between a seat back frame and one of the side bolsters with the side bolster in the deployed position.

The seat back frame 22 includes a pair of laterally spaced apart seat back brackets 32 at either end of the lower cross member 30. The seat back brackets 32 are disposed inward of and are pivotally coupled to a pair of seat cushion brackets 34 by seat back recliner mechanisms 36 of any suitable type known to one skilled in the art, as shown in FIG. 5. The seat back recliner mechanisms 36 include a recliner shaft (not shown) defining an axis A about which the seat back 14 pivots relative to the seat cushion 12. The seat back recliner mechanisms 36 are operatively coupled together such that a handle (not shown) mounted on the seat assembly 10 actuates the seat back recliner mechanisms 36 simultaneously between locked and unlocked states.

Referring to FIGS. 1 through 4, the seat assembly 10 includes a pair of side bolsters 38 for providing lateral support to the seat occupant. More specifically, each of the side bolsters 38 extend between an upper end 40 pivotally hinged to one of the pair of side frame members 24, 26 at pivot 41 and a lower end 42. The side bolsters 38 are movable between a deployed position, shown in FIGS. 1 through 3, extending away from the vertical plane defined by the side frame members 24, 26, and a retracted position, shown in FIG. 4, generally co-planar with the vertical plane.

Referring to FIG. 1, a pair of spaced apart and generally parallel support plates 44 is disposed between the side frame members 24, 26 and extends between the upper cross member 28 and the lower cross member 30. The support plates 44 define a center section of the seat back 14, generally between the support plates 44, for supporting a center section foam pad (not shown). In addition, the support plates 44 provide separation between the center section and the side bolsters 38 such that the side bolsters 38 each move between the deployed and retracted positions without interference from the center section foam pad.

Figure 6:
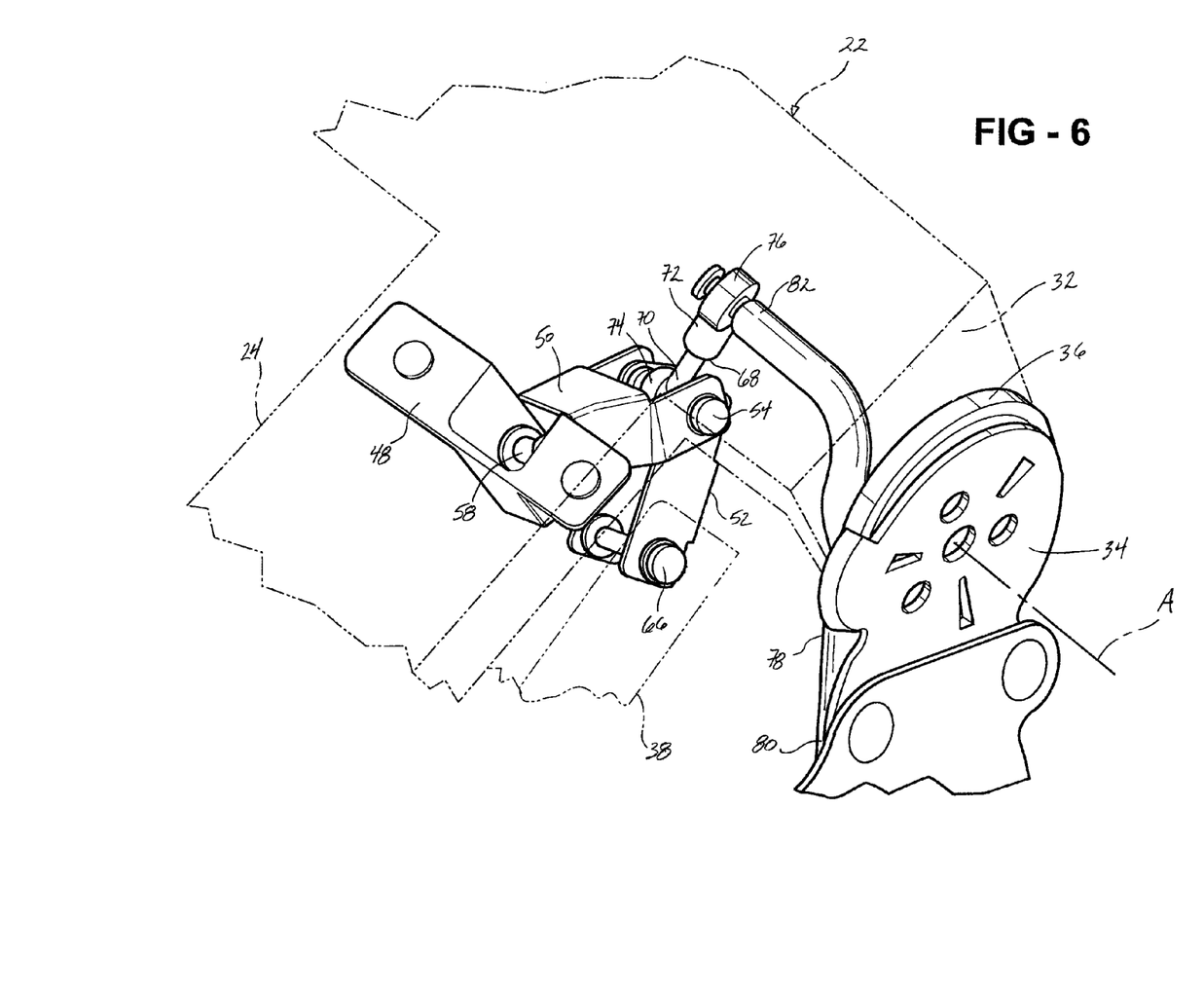
FIG. 6 is an enlarged, side perspective view of the linkage folded together between the seat back frame and one of the side bolsters with the side bolster in the retracted position.

Referring to FIG. 5, a linkage, generally indicated at 46, extends between a mounting bracket 48 fixedly secured along the side frame member 24 and one of the side bolsters 38. The linkage 46 includes a first link 50 and a second link 52, which are pivotally coupled to one another by a common link pin 54. A distal end 56 of the first link 50 is pivotally coupled at a double-pivot joint to the mounting bracket 48 by a first pivot pin 58. A proximal end 60 of the first link 50 is pivotally coupled at a double-pivot joint to a proximal end 62 of the second link 52 by the link pin 54. The second link 52 includes a distal end 64 pivotally coupled at a double-pivot joint to the lower end 42 of the side bolster 38 by a second pivot pin 66. The double-pivot joints prevent any twisting of the first 50 and second 52 links as the side bolster 38 moves between the deployed and retracted positions. When the side bolster 38 is in the deployed position, the first 50 and second 52 links are linearly aligned, as shown in FIG. 5. When the side bolster 38 is in the retracted position, the first 50 and second 52 links are folded together, as shown in FIG. 6.

The mounting bracket 48 is fixedly secured to the side frame member 24 at an angle such that the linkage 46 extends forward and outward relative to the seat back frame 22. It will be appreciated that the angle of the linkage 46 provides for a narrow seat back 14 when the side bolsters 38 are in the retracted position and a wider, more comfortable seat back 14 when the side bolsters 38 are in the deployed position. The narrow seat back 14 provides for compactly stowing the seat assembly 10 in the recess 16 formed in the floor 18.

A control link 68 extends between a first end 70 and a second end 72. The first end 70 of the control link 68 is pivotally and rotatably coupled by a ball joint 74 to the link pin 54. The second end 72 of the control link 68 is pivotally and rotatably coupled by a ball joint 74 to a connecting bracket 78, which in turn is fixedly secured to the seat cushion bracket 34. The attachment of the control link 68 to the linkage 46 results in the side bolster 38 being operatively connected to the seat cushion 12.

The connecting bracket 78 is adapted for securing the second end 72 of the control rod 68 to the seat cushion bracket 34. In the embodiment shown, the connecting bracket 78 is a rigid, pre-formed rod extending between a first end 80 and a second end 82. The first end 80 is fixedly secured to the seat cushion bracket 34 by welding or like methods. The second end 82 is adapted for receiving the ball joint 76 at the second end 72 of the control rod 68. The connecting bracket 78 extends inward from the seat cushion bracket 34, upward around the recliner mechanism 36 and seat back bracket 32, and inward again, terminating at the second end 82. This portion is spaced from and extends generally parallel to axis A. Second end 82 receives pivot bracket 76 of second end 72 of control link 68.

In operation, to start, the seat back 14 is in the upright seating position and the side bolsters 38 are in the deployed position. The seat back 14 can be adjusted to the fold flat position overlying the seat cushion 12 by lifting the handle mounted on the seat assembly 10, thereby actuating the recliner mechanisms 36 to the unlocked state. With the recliner mechanisms 36 in the unlocked state, the seat back 14 pivots forward about the axis A urging the side bolsters 38 into the retracted position so that the seat back 14 can be folded flat against the seat cushion 12. More specifically, as the seat back 14 pivots about the axis A in a counterclockwise direction (when viewed from FIG. 2) the link pin 54 would otherwise travel along a primary arc R. However, the control link 68 pivots about the second end 82 of the connecting bracket 78 in the counterclockwise direction such that the first end 70 of the control link 68 travels along a smaller, secondary arc S, thereby pulling on the link pin 54. The control link 68 pulls on the link pin 54 causing the first 50 and second 52 links to fold together, which in turn pulls the side bolster 38 into the retracted position as the seat back 14 pivots into the fold flat position.

To return the side bolsters 38 to the deployed position, the recliner mechanisms 36 are unlocked to pivot the seat back 14 from the fold flat position to the upright seating position. More specifically, as the seat back 14 pivots about the axis A in the clockwise direction (when viewed from FIG. 4) the link pin 54 is influenced by the first end 70 of the control link 68 which travels along the secondary arc S, thereby pushing on the link pin 54. The control link 68 pushes on the link pin 54 causing the first 50 and second 52 links to linearly align, which in turn pushes the side bolster 38 into the deployed position as the seat back 14 pivots into the upright seating position.

Again, starting with the seat back 14 in the upright seating position, the seat back 14 can be adjusted to any of the range of reclined seating positions by lifting the handle mounted on the seat assembly 10, thereby actuating the recliner mechanisms 36 to the unlocked state. With the recliner mechanisms 36 in the unlocked state, the seat back 14 pivots rearward about the axis A and the side bolsters 38 remain in the deployed position. More specifically, as the seat back 14 pivots about the axis A in the clockwise direction (when viewed from FIG. 2) the link pin 54 is guided by the control link 68 as the control link 68 pivots about the second end 82 of the connecting bracket 78 in the clockwise direction such that the first end 70 of the control link 68 travels along the secondary arc S. In the embodiment shown, the primary R and secondary S arcs are oriented such that the link pin 54 follows the same path through about twenty-five degrees of rearward recline without the control link 68 pulling on the link pin 54. Thus, the first 50 and second 52 links remain linearly aligned, thereby maintaining the side bolsters 38 in the deployed position as the seat back 14 pivots between the range of reclined seating positions.

It will be appreciated that the amount of rearward recline with the side bolsters 38 in the deployed position may be greater than or less than twenty-five degrees without varying from the scope of the invention.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly for supporting an occupant in an automotive vehicle above a floor, said seat assembly comprising:
   a seat cushion;
   a seat back pivotally coupled to said seat cushion for selective movement between a generally upright seating position, a range of reclined seating positions, and a forward fold flat position overlying said seat cushion;
   a pair of side bolsters, each of said pair of side bolsters pivotally coupled to said seat back and operable to automatically move between a deployed position extending away from said seat back and a retracted position adjacent to said seat back in response to pivoting said seat back between said generally upright seating position and said forward fold flat position;
   a linkage operatively coupled to said seat back and said pair of side bolsters, said linkage including first and second links pivotally coupled together by a common link pin; and
   a rigid control link extending between a first end coupled directly to said common link pin and a second end coupled to said seat cushion, wherein said control link pushes said common link pin thereby urging said pair of side bolsters to said deployed position as said seat back pivots to said generally upright seating position, and wherein said control link pulls said common link pin thereby urging said pair of side bolsters to said retracted position as said seat back pivots to said forward fold flat position.

2. A seat assembly as set forth in claim 1 wherein said first link extends between a first distal end pivotally coupled to said seat back and a first proximal end, and said second link extends between a second distal end pivotally coupled to one of said pair of side bolsters and a second proximal end pivotally coupled to said first proximal end of said first link by said common link pin.

3. A seat assembly as set forth in claim 2 wherein said first and second links are generally linearly aligned when said pair of side bolsters is in said deployed position and wherein said first and second links are folded together when said pair of side bolsters is in said retracted position.

4. A seat assembly as set forth in claim 1 wherein said control link maintains said pair of side bolsters in said deployed position as said seat back pivots between said range of reclined seating positions.

5. A seat assembly as set forth in claim 4 wherein said range of reclined seating positions is about twenty-five degrees of recline rearwardly of said generally upright seating position.

6. A seat assembly as set forth in claim 1 including a connecting bracket fixedly secured to said seat cushion, wherein said second end of said control link is coupled directly to said connecting bracket.

7. A seat assembly as set forth in claim 6 wherein said connecting bracket is adapted such that as said seat back pivots between said range of reclined seating positions said control link pivots about said connecting bracket without applying a force to said common link pin thereby maintaining said pair of side bolsters in said deployed position.

8. A seat assembly for supporting an occupant in an automotive vehicle above a floor, said seat assembly comprising:
   a seat cushion;
   a seat back pivotally coupled to said seat cushion for selective movement between a generally upright seating position, a range of reclined seating positions, and a forward fold flat position overlying said seat cushion;
   a pair of side bolsters, each one of said pair of side bolsters extending between an upper end pivotally coupled to said seat back and a lower end operatively coupled to said seat cushion, wherein said pair of side bolsters automatically move from a deployed position extending away from said seat back to a retracted position adjacent to said seat back in response to pivoting said seat back from said generally upright seating position to said forward fold flat position, and wherein said pair of side bolsters automatically move from said retracted position adjacent to said seat back to said deployed position extending away from said seat back in response to pivoting said seat back from said forward fold flat position to said generally upright seating position;
   a linkage operatively coupled between said seat back and each one of said pair of side bolsters, each said linkage including a first link extending between a first distal end pivotally coupled to said seat back and a first proximal end and a second link extending between a second distal end pivotally coupled to one of said pair of side bolsters and a second proximal end pivotally coupled to said first proximal end of said first link by a common link pin; and
   a rigid control link extending between a first end coupled directly to said common link pin and a second end coupled to said seat cushion, wherein said control link pushes said common link pin thereby urging said pair of side bolsters to said deployed position as said seat back pivots to said generally upright seating position and wherein said control link pulls said common link pin thereby urging said pair of side bolsters to said retracted position as said seat back pivots to said forward fold flat position.

9. A seat assembly as set forth in claim 8 wherein said first and second links are generally linearly aligned when said pair of side bolsters is in said deployed position and wherein said first and second links are folded together when said pair of side bolsters is in said retracted position.

10. A seat assembly as set forth in claim 8 wherein said control link maintains said pair of side bolsters in said deployed position as said seat back pivots between said range of reclined seating positions.

11. A seat assembly as set forth in claim 10 wherein said range of reclined seating positions is about twenty-five degrees of recline rearwardly of said generally upright seating position.

12. A seat assembly as set forth in claim 8 including a connecting bracket fixedly secured to said seat cushion, wherein said second end of said control link is coupled directly to said connecting bracket.

13. A seat assembly as set forth in claim 12 wherein said connecting bracket is adapted such that as said seat back pivots between said range of reclined seating positions said control link pivots about said connecting bracket without applying a force to said common link pin thereby maintaining said pair of side bolsters in said deployed position.

14. A seat assembly for supporting an occupant in an automotive vehicle above a floor, said seat assembly comprising:
   a seat cushion;

a seat back pivotally coupled to said seat cushion for selective movement about an axis between a generally upright seating position, a range of reclined seating positions, and a forward fold flat position overlying said seat cushion;

a pair of side bolsters, each of said pair of side bolsters operable to automatically move between a deployed position extending away from said seat back and a retracted position adjacent to said seat back in response to pivoting said seat back between said generally upright seating position and said forward fold flat position;

a linkage operatively coupled to said seat back and said pair of side bolsters, said linkage including first and second links pivotally coupled together by a common link pin; and a rigid control link extending between a first end coupled directly to said common link pin and a second end coupled directly to a fixed pivot location on said seat cushion that is offset from said axis, wherein said second end of said control link pivots about said fixed pivot location and said first end of said control link pushes said common link pin thereby urging said pair of side bolsters to said deployed position as said seat back pivots about said axis to said generally upright seating position, and wherein said second end of said control link pivots about said fixed pivot location and said first end of said control link pulls said common link pin thereby urging said pair of side bolsters to said retracted position as said seat back pivots about said axis to said forward fold flat position.

* * * * *